United States Patent [19]
Abthoff et al.

[11] 4,077,368
[45] Mar. 7, 1978

[54] FOUR-CYCLE RECIPROCATING-PISTON INTERNAL COMBUSTION ENGINE

[75] Inventors: Jörg Abthoff, Pluderhausen; Günther Bubeck, Schorndorf; Roland Fink, Asperg; Ludwig Fricker, Stuttgart; Karlheinz Gube, Waiblingen; Jürgen Lammer, Korb; Hans-Dieter Schuster, Schorndorf; Hans-Joachim Sponagel, Stuttgart, all of Germany

[73] Assignee: Daimler-Benz Aktiengesellschaft, Stuttgart, Germany

[21] Appl. No.: 663,047

[22] Filed: Mar. 2, 1976

[30] Foreign Application Priority Data

Mar. 8, 1975 Germany .................. 2510176

[51] Int. Cl.² .................. F02B 19/12; F02B 19/18
[52] U.S. Cl. .................. 123/32 ST; 123/32 SP
[58] Field of Search ........... 123/32 SP, 32 ST, 33 D, 123/143 B, 191 S, 191 SP

[56] References Cited

U.S. PATENT DOCUMENTS

| 2,201,221 | 5/1940 | Bokemuller | 123/33 D |
|---|---|---|---|
| 2,758,576 | 8/1956 | Schlamann | 123/32 SP UX |
| 3,207,141 | 9/1965 | Freeman et al. | 123/32 SP UX |
| 3,304,922 | 2/1967 | Hideg | 123/32 R |
| 3,508,530 | 4/1970 | Clawson | 123/191 S |
| 3,824,965 | 7/1974 | Clawson | 123/32 ST X |
| 3,890,942 | 6/1975 | Date et al. | 123/32 SP X |
| 3,905,343 | 9/1975 | Ryan | 123/32 ST X |

Primary Examiner—Carlton R. Croyle
Assistant Examiner—Michael Koczo, Jr.

[57] ABSTRACT

A four-cycle reciprocating-piston internal combustion engine having a main combustion chamber connected by a spill port with an unflushed ignition chamber. A fuel injection nozzle and a spark plug are arranged at the ignition chamber at angles with respect to one another. Fuel supply means are also provided at the main combustion chamber for supplying a substantial majority of the fuel consumed by the engine during operation. In order to maximize the effectiveness of the ignition chamber, while minimizing the high peak pressures, the ignition chamber and spill port are constructed so as to have an extensive homogenization of the fuel proportion injected into the ignition chamber. In preferred embodiments, the ratio of the volume of the ignition chamber to the total compression volume of the engine is in the range of 0.10 to 0.30 and the ratio of the volume of the spill port to the total compression volume is in the range of 0.01 to 0.25. Further, the injection nozzle provides between 2 and 10% of the total maximum full-load quantity of fuel for the engine and the injection of fuel into the ignition chamber is initiated during the intake stroke movement of the piston bounding the main combustion chamber.

18 Claims, 3 Drawing Figures

U.S. Patent March 7, 1978 4,077,368
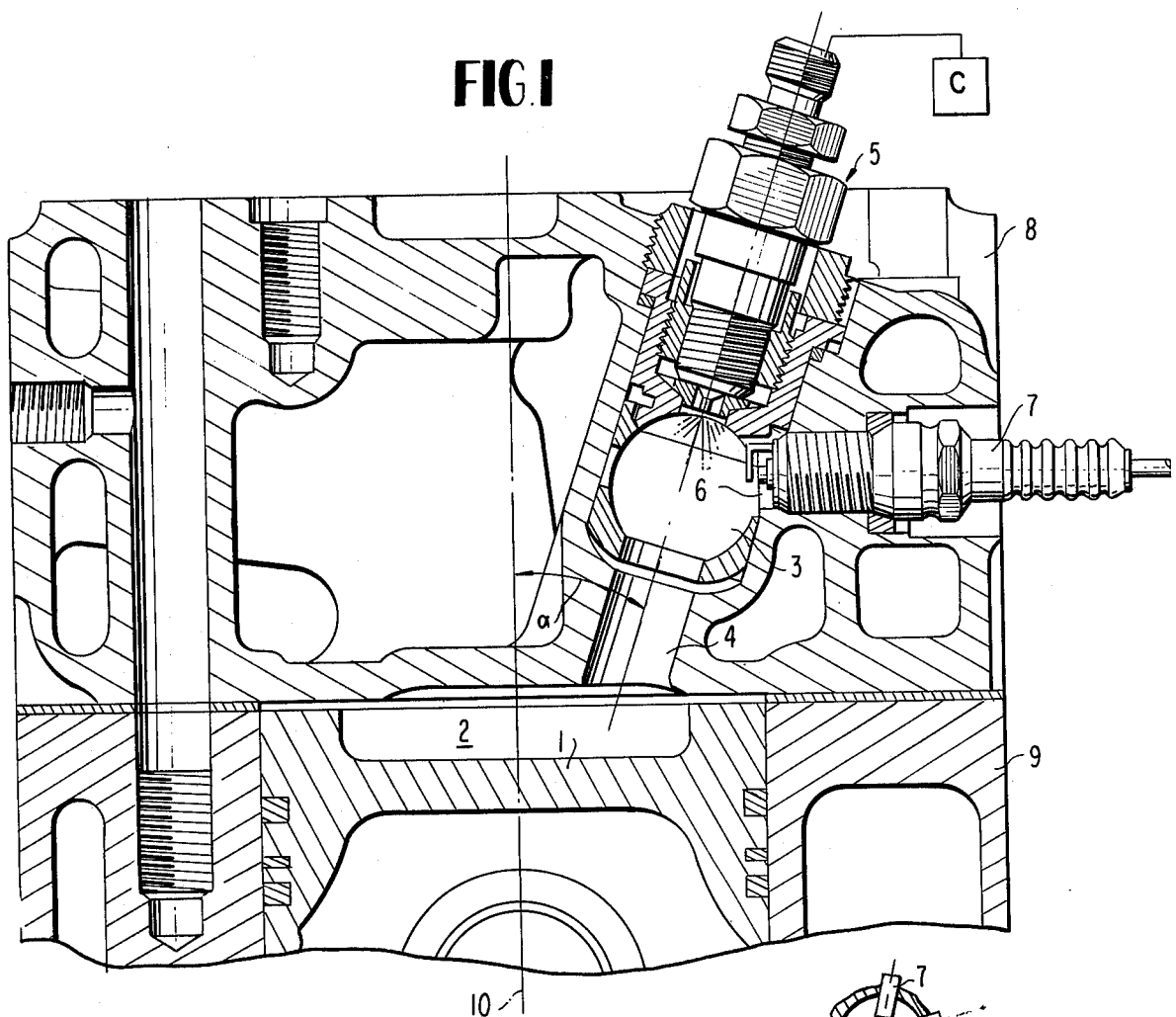
FIG.1
FIG.2
FIG.1A
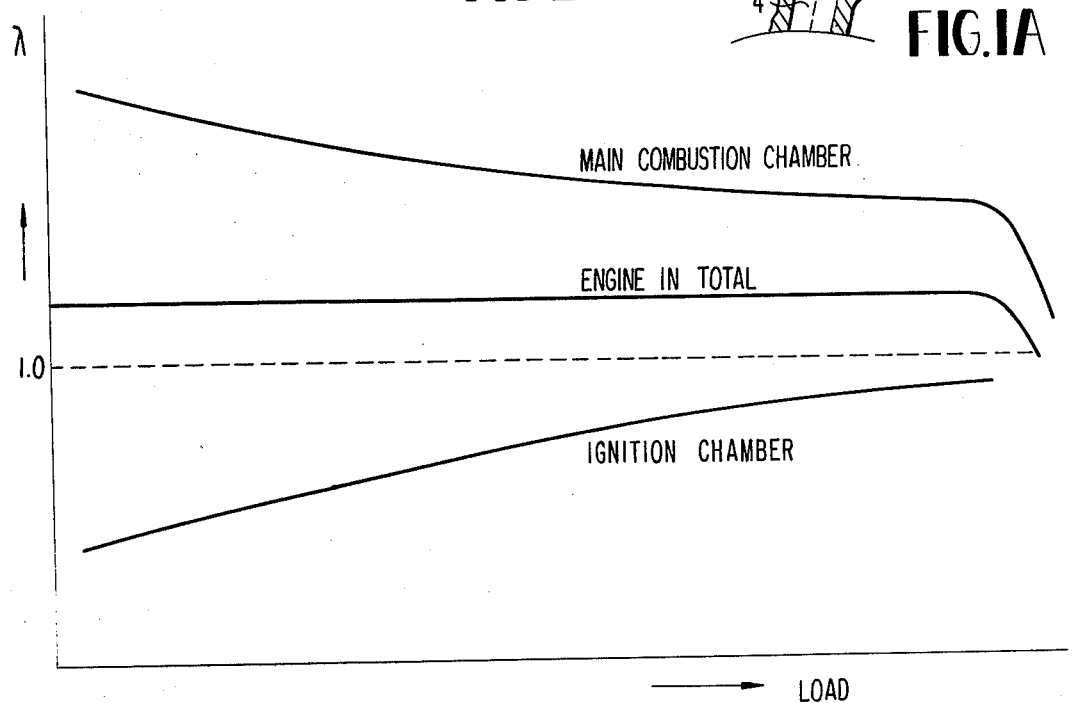

FOUR-CYCLE RECIPROCATING-PISTON INTERNAL COMBUSTION ENGINE

BACKGROUND AND SUMMARY OF THE INVENTION

This invention relates to a four-cycle reciprocating-piston internal combustion engine with an unflushed ignition chamber in communication with the main combustion chamber by way of a spill port or overflow duct. This ignition chamber is associated with a spark plug and, at an angle to the latter, an injection nozzle, by means of which an amount of fuel is injected which is a fraction of the full-load quantity.

In a conventional internal combustion engine of this type (German Pat. No. 1,251,577), the volume of the ignition chamber terminating in the main combustion chamber via a spill port represents only a relatively small proportion of the total compression volume. In conjunction with the spill port of a relatively small cross section as employed in this structure, this arrangement results in a high flame exit speed and a correspondingly abrupt ignition of the taken-in amount of primary mixture. The cause of this is, inter alia, that strictly separate mixture zones are formed between the ignition chamber and the main combustion chamber. As a consequence, there results high peak pressures with a comparatively low intermediate pressure, so that the operating characteristic and efficiency, as compared to those of conventional Otto-type engines, cannot be satisfactory.

It is contemplated by this invention to construct an engine of the aforementioned type so that, with advantageous loads on the engine, i.e., a soft combustion characteristic which is desirable especially also for reasons of comfort, there results a good exhaust gas quality with especially a low proportion of nitrogen oxides.

According to preferred embodiments of this invention, an internal combustion engine of the type mentioned hereinabove is constructed so that the ratio between the volume of the ignition chamber and the total compression volume is 0.10 – 0.30 and the ratio between the volume of the spill port and the total compression volume is 0.01 – 0.25; and that the beginning of the injection into the ignition chamber, wherein approximately 2-10% of the maximum full-load quantity is injected, is in the intake stroke. In particular preferred embodiments, the beginning of the injection is at a crank angle of between 200° and 300° before the end of the compression stroke.

This construction of the invention leads, due to the early beginning of injection, to an extensive homogenization of the fuel proportion injected into the ignition chamber and furthermore also results, due to the relationship of the size of the ignition chamber to the injection quantity, in a satisfactory ignitability without the danger of over-enrichment in the ignition chamber. The construction also makes it possible to utilize fuels having a low octane number (regular fuels). Additionally, the arrangements of the invention provides relatively high intermediate pressures due to the given volume ratio between the ignition chamber and the total compression volume and/or between the ignition chamber and the spill port, with a relatively wide spill port and a soft engine operation. Consequently, based on the cylinder capacity of the engine, a high efficiency can also be attained for such ignition chamber engines.

For the desired, soft operating characteristic, it proves to be advantageous according to the invention to provide that, based on a reference ignition chamber with a corresponding volume and of a spherical shape, the diameter of the spill port to the diameter of the ignition chamber is at a ratio of between 0.3 and 0.7.

In one embodiment of the invention, the amount of fuel injected into the ignition chamber is either maintained at a constant value, namely independent of the load and speed, or it is controlled so that the amount injected is reduced with an increasing load and speed. U.S. Pat. No. 3,508,530 to Clawson discloses a prior arrangement with the amount of fuel injected into the ignition chamber being independent of the load and speed of the invention, while U.S. Pat. No. 3,824,965 to Clawson discloses a prior arrangement with reduction of the injected amount of fuel with inceasing load and/or speed of the engine.

According to the invention, the axes of the spark plug and the injection nozzle are oriented preferably at a mutual angle of between 60° and 90°, whereby the danger of wetting of the spark plug is diminished, and thus the starting conditions for the engine are improved.

In another preferred embodiment, the axis of the spill port is approximately congruent with the axis of the spark plug. In other preferred embodiments, the axis of the injection nozzles lies approximately in parallel to the axis of the spill port. In yet other preferred embodiments, the axis of the injection nozzle is congruent with the axis of the spill port. A position of the axis of the injection nozzle wherein it is offset with respect to the axis of the spill is advantageous especially in case of turbulence (swirl) chambers, in certain preferred embodiments. Furthermore, a position of the axis of the injection nozzle approximately in parallel to the axis of the spill port is suitable to ensure uniform conditions in the ignition chamber and to attain a minor wall proportion. Finally, such a position of the injection nozzle can also be advantageous for obtaining a good stratification in the zone of the spill port, thus creating gradual transitions with regard to the mixture ratios. In this connection, it is to be taken into account that the amount of fuel introduced into the ignition chamber is very small and that, at least above the idling range, the main proportion of the fuel is introduced directly into the main combustion chamber, namely under the control of the throttle valve either by way of a carburetor or by way of a suction pipe injection system. In total, the design is selected so that the air-fuel ratio $\lambda$ over the entire partial load range of the engine is at least approximately constant and is preferably $\lambda = 1.1$. In correspondence with the constant amount of fuel introduced into the ignition chamber, a relatively rich mixture is present in the ignition chamber at low load or in the idling range, while the amount of fuel fed to the main combustion chamber is dimensioned so that a lean mixture is obtained in the latter chamber during the aforementioned ranges. In the pure full-load range, the total mixture can be enriched to $\lambda < 1$ for reasons of attaining optimum efficiency.

Due to the early injection time for the nozzle which injects into the ignition chamber, it is possible to operate herein with a low-pressure injection nozzle, the spraying pressure of which is between about 10 and 40 bars. In this connection, the use of such injection nozzles proves advantageous which spray with a spray cone of up to about 45°.

Due to the fact that, as compared to engines wherein the entire amount of fuel is introduced into the main combustion chamber, a higher air-fuel ratio exists in the main combustion chamber than for the entire engine, the danger of spontaneous ignitions is reduced, and thus it is possible even with fuels having a low octane number to still attain compression ratios of up to an $\epsilon$ of about 14.

These and further objects, features and advantages of the present invention will become more obvious from the following description when taken in connection with the accompanying drawings which show, for purposes of illustration only, plural embodiments in accordance with the present invention.

BRIEF DESCRIPTION OF THE DRAWINGS

FIG. 1 is a partial cross sectional view through the cylinder head zone of a four-cycle reciprocating-piston internal combustion engine constructed according to the present invention;

FIG. 1A is a partial, schematic view depicting details of a further embodiment of the present invention; and FIG. 2 shows, in a diagram, the curve of the air-fuel ratio plotted over the load at constant speed for the engine of FIG. 1.

DETAILED DESCRIPTION OF THE DRAWINGS

In the sectional view shown in FIG. 1, extending through the cylinder head zone of a four-cycle reciprocating-piston internal combustion engine, operating with low-boiling fuels, a plurality of details has been omitted, since the engine insofar can be constructed basically in the conventional form of single-cylinder or multicylinder engines of this type.

In the illustrated embodiment, the total combustion chamber above the piston 1 is subdivided into the main combustion chamber 2, essentially constituted by a piston trough, and an ignition chamber 3 in communication with the main combustion chamber by way of a spill port 4. The ignition chamber 3 has an essentially spherical inner cross section, and the axis of the essentially cylindrical spill port 4 extends, in the illustrated embodiment, through the center of the sphere.

In opposition to the spill port 4, the illustrated embodiment indicates a conical-shell fuel injection nozzle 5 arranged coaxially thereto. At right angles to the common axis of the injection nozzle 5 and the spill port 4, an aperture 6 for a spark plug 7 terminates in the ignition chamber. The ignition chamber consists preferably of a heat-resistant steel and is detachably connected to the cylinder head 8 to aid disassembly and assembly. The arrangement for the ignition chamber has been made so that the axis of the spill port 4 in the plane between the cylinder head 8 and the cylinder housing 9 is maximally close to the axis 10 of the piston bore.

In the illustrated sectional plane, the axis of the spill port is furthermore under an acute angle to the axis 10 of the piston bore and/or the cylinder 9, and, within the scope of the invention, a maximally small angle of inclination $\alpha$ has proven to be suitable between these two axes.

For operating the internal combustion engine, a constant, small amount of fuel of a few cubic millimeters per injection is injected by way of the nozzle 5 in a crank angle range of 200°-300° before the end of the compression stroke, i.e., before the ignition upper dead center position in the intake stroke. The injection jet has the shape of a conical shell and, during the intake stroke, a portion of this injected amount passes via the spill port 4 into the main combustion chamber 2 schematically depicted control C controls fuel supply to nozzle 5.

Likewise during the intake stroke, a lean mixture is introduced into the main combustion chamber 2 by way of the customarily provided inlet valve, not shown herein; this mixture is controlled by means of the throttle valve either by way of a carburetor or by way of a suction pipe injection system.

During the compression stroke, following the intake stroke, a portion of the rich ignition chamber mixture which has exited from the ignition chamber during the intake stroke, with an opposite air movement, is pushed back again into the ignition chamber, namely together with a proportion of the lean mixture taken in by the main combustion chamber. The richer mixture proportion from the ignition chamber, remaining in the main combustion chamber, forms a mixing zone between the two types of mixtures present in the main combustion chamber and in the ignition chamber. In total, these types of mixtures are quantitatively adapted to each other so that, in accordance with the diagram in FIG. 2, an air-fuel total mixture ratio $\lambda$ is attained of, in total, $\lambda = 1.1$ in the operating range governing for the consumption behavior and exhaust gas characteristic.

For the above-described, preferred embodiment, the volume and/or diameter relationships of this invention are so that the ratio of the ignition chamber volume to the total compression volume is about 0.2, and the volume of the spill port to the total compression volume is about 0.075. Furthermore, for a reference ignition chamber of a spherical shape, the diameter of the spill port, in the embodiment of this invention, is in a proportion to the diameter of the ignition chamber of approximately 0.5. The amount of fuel injected constantly and independently of the speed into the chamber per operating stroke amounts, in the embodiment of this invention, to about 4% of the maximum full-load injected quantity. The beginning of the injection is preferably at a crank angle of about 200°-300° before the ignition upper dead center position. Injection is desired within a maximally short time period without undesirable "after injection," preferable within a crank angle of about 20°.

The angle $\alpha$ is to be as small as constructionally feasible and preferably in the range of 0° to 30° being an especially preferred practical value for $\alpha$. Ignition is to take place in the range between 50° before top dead center and 10° after top dead center, a range customary for reciprocating piston internal combustion engines. The tendency applies that in case of partial load, ignition is earlier than at full load, and in case of idling, ignition takes place in the proximity of top dead center.

FIG. 1A schematically depicts another embodiment of the invention, similar to FIG. 1, except that the axes of the spill port 4 and of the spark plug 7 are approximately congruent, with the injection nozzle 5 at an angle thereto.

While we have shown and described several embodiments in accordance with the present invention, it is understood that the same is not limited thereto but is susceptible of numerous changes and modifications as known to those skilled in the art and we therefore do not wish to be limited to the details shown and described herein but intended to cover all such changes and modifications as are encompassed by the scope of the appended claims.

We claim:

1. A four-cycle reciprocating-piston internal combustion engine comprising:
   a main combustion chamber,
   an unflushed ignition chamber,
   a spill port communicating said main and ignition chambers with one another such that the combined volumes of the ignition chamber, the spill port, and the main combustion chamber in its most compressed condition together form the total compression volume.
   a fuel injection nozzle opening into said ignition chamber for supplying fuel to said ignition chamber,
   and a spark plug arranged at said ignition chamber at an angle to said injection nozzle for igniting fuel and air in said ignition chamber,
   wherein the ratio of the volume of the ignition chamber to said total compression volume is in the range of 0.10 to 0.30 and the ratio of the volume of the spill port to the total compression volume is in the range of 0.01 to 0.25,
   wherein the ratio of the diameter of the spill port to the diameter of a reference ignition chamber of a spherical shape is in the range of between 0.3 and 0.7,
   wherein a movable piston is provided which bounds the main combustion chamber,
   wherein injection means are provided for injecting fuel through said fuel injection nozzle,
   wherein said injection means includes means for injecting between 2 and 10% of the maximum full-load quantity of fuel supplied to said combustion chamber and ignition chamber during operation of said engine into said ignition chamber, said injection means including means for supplying the remaining quantity of fuel to the main combustion chamber, and
   wherein injection control means are provided for initiating injection of fuel into said ignition chamber during the intake stroke movement of the piston bounding the main combustion chamber.

2. An engine according to claim 1, wherein the beginning of the injection into said ignition chamber is at a crank angle of approximately between 200° and 300° before the end of the compression stroke of said piston.

3. An engine according to claim 2, wherein the injection control means includes means for controlling the amount of fuel injected into the ignition chamber independently of the load and of the speed of the engine.

4. An engine according to claim 2, wherein the injection control means includes means for controlling the amount of fuel injected into the ignition chamber so that the amount injected is reduced with increasing load and/or speed of the engine.

5. An engine according to claim 2, wherein the injection nozzles sprays with a spray cone of up to about 45°.

6. An engine according to claim 2, wherein the axes of the spill port and of the injection nozzle are approximately congruent.

7. An engine according to claim 6, wherein the injection nozzles sprays with a spray cone of up to about 45°.

8. An engine according to claim 1, wherein the ratio of the volume of the ignition chamber to said total compression volume is about 0.20 and the ratio of the volume of the spill port to the total compression volume is about 0.075.

9. An engine according to claim 8, wherein the ratio of the diameter of the spill port to the diameter of a reference ignition chamber of a spherical shape is approximately 0.5.

10. An engine according to claim 9, wherein said injection means includes means for injecting approximately 4% of the maximum full-load quantity of fuel supplied to said combustion chamber and ignition chamber during operation of said engine into said ignition chamber.

11. An engine according to claim 1, wherein the ratio of the diameter of the spill port to the diameter of a reference ignition chamber of a spherical shape is approximately 0.5.

12. An engine according to claim 1, wherein said injection means includes means for injecting approximately 4% of the maximum full-load quantity of fuel supplied to said combustion chamber and ignition chamber during operation of said engine into said ignition chamber.

13. An engine according to claim 1, wherein the injection control means includes means for controlling the amount of fuel injected into the ignition chamber independently of the load and of the speed of the engine.

14. An engine according to claim 1, wherein the injection control means includes means for controlling the amount of fuel injected into the ignition chamber so that the amount injected is reduced with increasing load and/or speed of the engine.

15. An engine according to claim 1, wherein the axes of the spark plug and of the injection nozzle are at a mutual angle of between 60° and 90°.

16. An engine according to claim 1, wherein the axes of the spill port and of the spark plug are approximately congruent.

17. An engine according to claim 1, wherein the axes of the spill port and of the injection nozzle are approximately congruent.

18. An engine according to claim 1, wherein the injection nozzle sprays with a spray cone of up to about 45°.

* * * * *